(12) United States Patent
Yang et al.

(10) Patent No.: US 10,368,479 B2
(45) Date of Patent: Aug. 6, 2019

(54) SEEDLING SEPARATING DEVICE BASED ON A GEAR-RACK DRIVE

(71) Applicant: Jiangsu University, Jiangsu (CN)

(72) Inventors: Qizhi Yang, Jiangsu (CN); Luyi Qian, Jiangsu (CN); Jun Gu, Jiangsu (CN); Jianping Hu, Jiangsu (CN); Mengtao Sun, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 15/744,616

(22) PCT Filed: Sep. 21, 2016

(86) PCT No.: PCT/CN2016/099515
§ 371 (c)(1),
(2) Date: Jan. 12, 2018

(87) PCT Pub. No.: WO2018/040148
PCT Pub. Date: Mar. 8, 2018

(65) Prior Publication Data
US 2019/0000010 A1    Jan. 3, 2019

(30) Foreign Application Priority Data

Aug. 29, 2016 (CN) .......................... 2016 1 0763805

(51) Int. Cl.
*A01C 11/02* (2006.01)
*A01G 9/029* (2018.01)
(Continued)

(52) U.S. Cl.
CPC ............ *A01C 11/02* (2013.01); *A01G 9/0299* (2018.02); *B65G 49/00* (2013.01); *B65G 65/005* (2013.01);
(Continued)

(58) Field of Classification Search
CPC .............................. A01C 11/02; A01G 9/0299
See application file for complete search history.

(56) References Cited

U.S. PATENT DOCUMENTS

| 5,121,701 A | * | 6/1992 | Reed ...................... A01C 11/02 |
| | | | 111/100 |
| 5,254,140 A | * | 10/1993 | Huang ................... A01G 9/086 |
| | | | 47/1.01 R |

(Continued)

FOREIGN PATENT DOCUMENTS

| CN | 103270839 A | 9/2013 |
| CN | 105103741 A | 12/2015 |

(Continued)

*Primary Examiner* — Jonathan Snelting
(74) *Attorney, Agent, or Firm* — Greenberg Traurig, LLP (57) ABSTRACT

This invention belongs to a seedling separating device based on a rack and pinion drive in the field of transplanting machine in the agricultural automation facility, including a rack, a power unit, a linear drive, a number of seedling cups and a cylinder pushing device. The linear actuator is driven by the power unit to move on the frame; these seedling cups are mounted on the linear drive; the cylinder pushing device is mounted on the frame and is located behind the seedling cups and it drives the lower part of the seedling cup to open and retracts to close. The seedling device has simple structure, controllable program and high reliability. The motor drives the seedlings cups to move left and right; the cylinder pushes the cups to be opened and closed; the trust cup is straight down, the seedling attitude is better and the location of seedling can also be adjusted. The device can not only achieve the exact location in the designated seedling, but also to achieve the seedling movement of separating seedlings to two points from the mouth of the seedling cups.

10 Claims, 8 Drawing Sheets

(51) Int. Cl.
*B65G 49/00* (2006.01)
*B65G 65/00* (2006.01)
*F16H 19/04* (2006.01)

(52) U.S. Cl.
CPC ..... *F16H 19/04* (2013.01); *B65G 2203/0266* (2013.01); *B65G 2203/042* (2013.01); *B65G 2812/12* (2013.01)

(56) References Cited

U.S. PATENT DOCUMENTS 5,573,558 A * 11/1996 Huang .................. A01C 11/02
  47/1.01 R
5,596,938 A * 1/1997 Shaw .................. A01C 11/025
  111/100

FOREIGN PATENT DOCUMENTS

| | | |
|---|---|---|
| CN | 105103745 A | 12/2015 |
| CN | 204810933 U | 12/2015 |
| JP | H07203724 A | 8/1995 |
| JP | 2002095318 A | 4/2002 |

* cited by examiner

SEEDLING SEPARATING DEVICE BASED ON A GEAR-RACK DRIVE

CROSS REFERENCE TO RELATED APPLICATIONS

The present application is a 371 U.S. National Stage of International Application No. PCT/CN2016/099515, filed Sep. 21, 2016, entitled "A SEEDLING SEPARATING DEVICE BASED ON A GEAR-RACK DRIVE" which in turn claims priority to Chinese Application 201610763805.0 with the same title filed Aug. 29, 2016, both of which are incorporated herein by reference in its entirety.

TECHNICAL FIELD

The present invention belongs to the field of transplanting plants in agricultural automation facilities, and more particularly to a seedling separating device based on a rack-rack drive.

BACKGROUND TECHNIQUE

At present, mechanized transplanting has been a great development with a wide range of functions and diverse, but generally are general-purpose transplant machines. As a result of the different sizes and physical characteristics of various vegetable seedlings and some planting requirements such as line spacing, plant spacing, the same ridge planted number, it has a certain degree of difficulty to take the general use of large-scale transplanting machine in China's various types of vegetable fields. There are many repetitive labors from the beginning of the nursery to transplant of plug seedlings, manual continuous work easy to make people tired and are prone to leakage and other problems.

Multi-row transplanting machine, such as Fu Laiwei company developed a semi-automatic rape seedlings transplanting machine. This kind of seedling device is powered by a small tractor. The tractor and the transplanting machine are connected by a three-point suspension method. The deflector and the chain clamp are used in the device. The four people ride on the above to carry out four rows of transplanting, by the artificial rape seedlings into the clamp above the box. With the movement of the jaws, the rape seedlings are held to do circular motion on the disk. When the seedlings go to the lowest point to have been opened of the seedling ditch, the jaws open, then the seedlings fall into the ditch, followed by the suppression of crater compaction.

Single-line transplanting machines are commonly used in the domestic circular carousel, in which the general diameter of seedling cups is slightly larger than the seedlings to ensure the whereabouts of smooth. Its working principle is the use of trough mechanism or incomplete gear to transmit intermittent movement. In order to avoid destroying the seedling roots in the rotation of seedling cups in the disc, a valve body is designed in the bottom of the seedling cups, so that the door will be opened when it comes to the gap and be successfully closed after the completion of seedling separation.

Multi-ring conveyor chain sub-institutions are more used at home and abroad, such as the well of the two rows of semi-automatic vegetable transplant machine. The machine has a single ride with circular cups, in which a person can complete the transplanting mission of two lines. The circular cups are rotated under the action of the conveyor chain. When reaching the top of the plant, the odd-numbered staggering seedlings can be realized through special trigger devices. These seedling cups are usually larger in diameter than the bowl seedlings to ensure smooth running, but this from requires more power, more cups and heavy weigh to achieve rotation than the single-line transplanting machine.

If the design is not reasonable, force and motion simulation is not accurate, it is likely to cause many problems, such as too large seedling sprocket peak force, lack of power, or uneven distribution of power. Therefore, it is of great significance to design a new and simple seedling mechanism.

INVENTION CONTENTS

It is an object of the present invention to provide a seedling separating device based on a gear-rack drive in view of the above-mentioned problems. The device can not only achieve the exact location in the designated seedling, but also to achieve the seedling movement of separating seedlings in two points from the mouth of the seedling cups.

The technical proposal of the invention is a seedling separating device based on the rack and gear drive, which comprises a frame, a power device, a linear transmission device, a plurality of cups, a cylinder pushing device and a control system;

A sensor and a sensor holder are mounted on the frame; one end of the sensor holder is mounted on the frame through a sensor mounting hole; the sensor is mounted on the other end of the sensor holder;

The power device includes a motor connection plate, a gear, a sleeve and a motor; the motor is fixed on the upper end of the motor connection plate; the shaft sleeve is arranged on the rotation shaft of the motor and is fixedly connected with the motor; the lower end of the gear is braced and fixedly connected with the rotating shaft of the motor;

The linear transmission device includes a cup holder, cup mounting holes, a slider connecting plate, a slider, a cup connecting plate and a linear guide; the linear guide is fixed to the frame through a linear guide mounting hole; the slider is mounted within a linear guide; the slider connecting plate is mounted on the slider by screws; the cup connection plate is provided with through holes and is located between the slider connecting plate and the cup holder; the slider connecting plate is connected with the cup holder by screws; the cup holder is provided with a plurality of cup mounting holes; the seedling cups are mounted on a cup holder by screws; the rack is fixed to the frame through a rack mounting hole and is meshed with the gear;

The cylinder pushing device is mounted on the frame and is located behind the cup; the cylinder pushing device drives the lower part of the cup to open and retracts it to close;

The control system comprises a PLC central control unit, a data acquisition unit and a device execution unit; the data acquisition unit comprises sensors; the PLC central control unit comprises a motor control module and a cylinder control module; the device execution unit comprises a motor and a cylinder; the motor control module comprises a motor control module and a cylinder control module; the PLC central control unit is respectively connected with the data acquisition unit and the device execution unit. The photoelectric sensor is used for sensing whether the motor reaches the set position and then transmitting the induction signal to the PLC central control unit. The motor control module controls the motor to stop or advance according to the signal. The cylinder control module controls the cylinder according to the signal to open or close the lower end of the seedling cup.

In the above aspect, the number of the cylinder pushing device is two, including a cylinder, a cylinder fitting, a cylinder connector, a screw and a pushing block, respectively;

The cylinders are respectively installed at both ends of the frame through cylinder mounting holes; one end of the cylinder fitting is screwed around a push rod of the cylinder and the other end of the cylinder fitting is connected to the cylinder connector by the screw; the cylinder connector is connected with the back side of the pushing block by a screw; the front face of the pushing block is curved.

Further, the number of the sensor and the sensor holder is two, and the two sensors are respectively mounted on both ends of the frame through the sensor holder;

In the above aspect, the seedling cup includes a support body, a screw, a joint bearing, a bearing seat, a short screw, a bearing, a spring, a first hinge and a second hinge;

The upper end of the cup body is connected with the cup holder by screw and the lower ends of the cup body are respectively connected with the hinges of the first and the second hinge; the lower part of the first and the second hinge are inverted triangles;

The two joint bearings are respectively mounted on the same end of the two hinge brackets and are dislocated up and down; the ends of the screw are respectively screwed to the joint bearing;

The two ends of the spring are fixedly connected with the other ends of the two hinge brackets respectively;

The bearing seat is mounted on the hinge side of the first hinge; the bearing is connected with the bearing seat through a short screw, and the bearing is rotated about the short screw; the curved surface of the pushing block can be in contact with the bearing.

Further, the seedling cup comprises a bushing connecting plate, a long screw and a bush;

The bushing connecting plate is a right angle plate and is provided with through holes on both sides of the straight plate. Four bushing connecting plates are respectively connected with the hinge bracket at the lower end of the supporting cup body and the positions of four corners of the hinge stent. One side of the baffle connecting plate is connected with the lower end of the cup main body and the other side is connected with the hinge bracket;

The sleeve is located between two bushing connecting plates and two of them are connected by a long screw, which can be rotated about by the first and second hinge.

The above scheme also includes two sensors and two sensor brackets;

One end of the sensor holder is respectively mounted on the frame through a sensor mounting hole and the sensor is mounted on the other end of the sensor holder.

In the above aspect, there are two oval-shaped movable frame slots in the middle of the cup holder.

In the above aspect, the transmission mounting brackets are provided on both sides of the motor connecting plate and the slider connecting plate, respectively;

The transmission mounting bracket is a right angle plate, and its upper straight plate is connected with one side of the slider connecting plate by screws, then its lower straight plate is connected with the motor connecting plate by screws.

In the above aspect, the frame is provided with a slider moving groove; the lower end of the slider can be moved left and right in the slider movement groove.

In the above aspect, the number of seedling cups is six.

Further, the distance between the two cylinder pushing devices is spaced by three cups; the distance between the two said sensors is the distance between the three cups subtracting the lateral distance of the power unit.

The beneficial effects of the present invention are:

1. Traditional seedling device, such as rotating cup-type seedling device requires a considerable number of cups to rotate the seedlings. This device is innovative use of left and right repeated mobile cast method, greatly reducing the number of unnecessary seedling cups, simplifying the structure, reducing the load and the power demand for equipment.

2. PLC program control is used in quite a lot of places in this seedling device to achieve positioning cast seedlings, timing cast seedlings, and greatly improving precision relative to the traditional mechanical linkage sub-device.

3. In the seedling device, the motor drives seedling cups around the move, the cylinders push the cups to be opened and closed. Down the seedling attitude is better, due to the seedling cups vertical down, and the point position of seedling can also be adjusted.

4. The seedling device can also increase or reduce the number of seedling cups according to the actual situation, to adapt to a variety of different planting conditions, such as 2 lines of planting or 4 lines of planting, etc., so its versatility improves a lot compared to drive sub-seedling devices.

5. The seedling device improved the positioning accuracy and avoided the cumulative error through the sensors.

In the figure:
1, the frame;
2, the power plant;
3, the linear transmission;
4, the seedling cup;
5, the cylinder pushing device;
6, linear guide mounting holes;
7, rack mounting holes;
8, cylinder mounting holes;
9, the sensors;
10, the slider movement slot;
11, the sensor mounting hole;
12, the sensor bracket;
13, the rack;
14, the motor connection plate;
15, the gear;
16, bushings;
17, the motor;
18, the cup moving frame;
19, the cup mounting hole;
20, the moving frame slot;
21, the slider connection plate;
22, the slider;
23, the cup connection plate;
24, the linear guide;
25, the drive installation bracket;
26, the main body of the cup;
27, the screw;
28, joint bearings;
29, the bearing seat;
30, the short screw;
31, the bearing;
32, the sleeve connecting plate;
33, a long screw;
34, the spring;
35, the first hinge;
36, the second hinge;
37, the through hole of the cup;
38, the sleeve connecting plate through hole;
39, the sleeve;
40, the cylinder;
41, the cylinder accessory;
42, cylinder connector;
43, the screw;
44, the pushing block;
45, the hinge stent.

DETAILED DESCRIPTION

The present invention will now be described in further detail with reference to the accompanying drawings and detailed description, but the scope of the present invention is not limited thereto.

Figure 1:
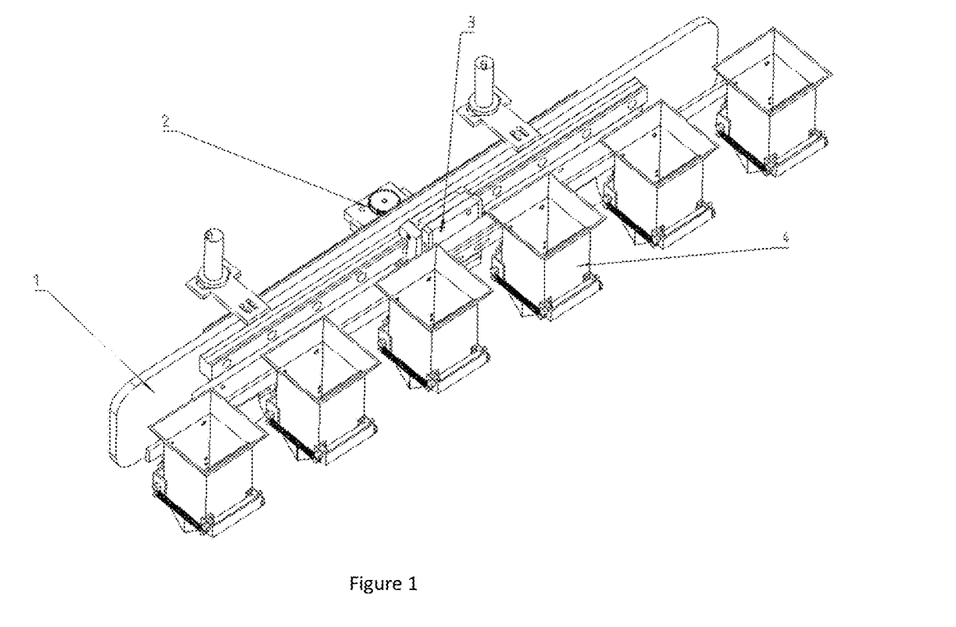
FIG. 1 is a schematic structural view of a transplanting seedling separating device according to an embodiment of the present invention.
Figure 2:
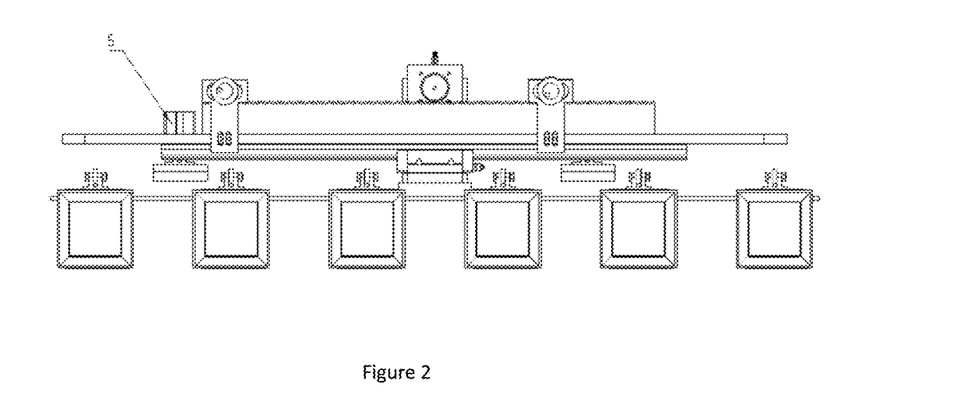
FIG. 2 is a plan view of a transplanting seedling separating device according to an embodiment of the present invention.

As shown in FIGS. 1 and 2, there is shown an embodiment of a plug-and-seedling separating device according to the present invention, which comprises a frame 1, a power unit 2, a linear actuator 3, a plurality of cups 4, a cylinder pushing device 5, and a control system.

Figure 3:
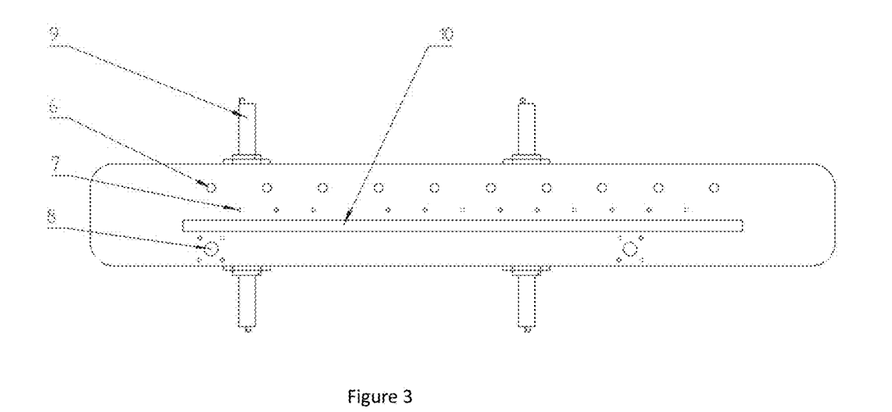
FIG. 3 is a front view of a frame according to an embodiment of the present invention.
Figure 4:
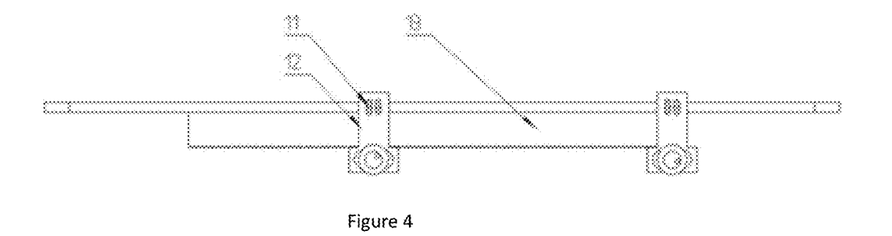
FIG. 4 is a plan view of a frame according to an embodiment of the present invention.

As shown in FIGS. 3 and 4, one side of the frame 1 is provided with a row of linear guide mounting holes 6, a row of rack mounting holes 7 and cylinder mounting holes 8; the top of the frame 1 is provided with sensor mounting holes 11. A sensor 9 and a sensor holder 12 are mounted on the frame 1; one end of the sensor holder 12 is mounted on the frame 1 through a sensor mounting hole 11, and the sensor 9 is mounted on the other end of the sensor holder 12. In the embodiment, the number of the sensor 9 and the sensor holder 12 is two, and the two sensors 9 are mounted on both ends of the frame 1 through the sensor holder 12, respectively.

Figure 5:
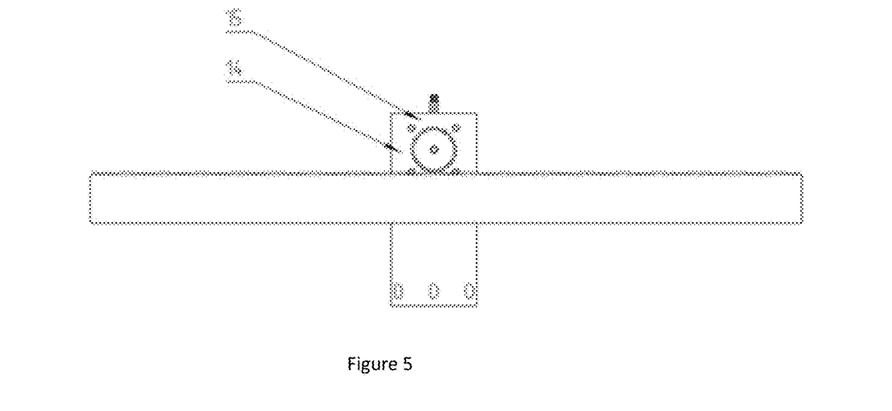
FIG. 5 is a top view of a power plant according to an embodiment of the present invention.
Figure 6:
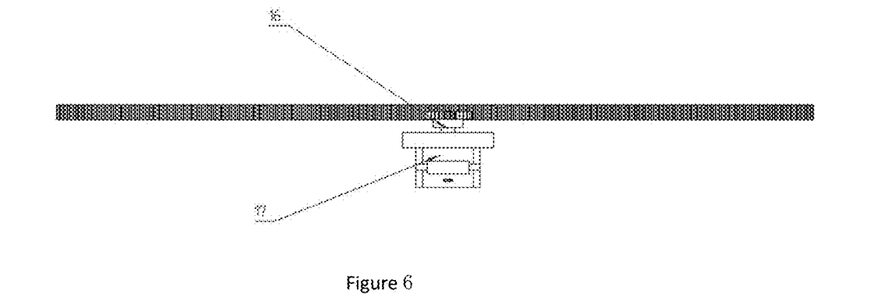
FIG. 6 is a front view of a power plant according to an embodiment of the present invention.

As shown in FIGS. 5 and 6, the power unit 2 includes a motor connection plate 14, a gear 15, a sleeve 16, and a motor 17. The motor 17 is screwed to four holes at the upper end of the motor connection plate 14; the sleeve 16 is tapped on a rotating shaft of the motor 17 and fixedly connected to the motor 17; the lower end of the gear 15 abuts against the sleeve 16 and the boss tapping thread on the gear 15 is fixed to the rotation shaft of the motor 17 and is also rotated with the motor 17.

Figure 7:
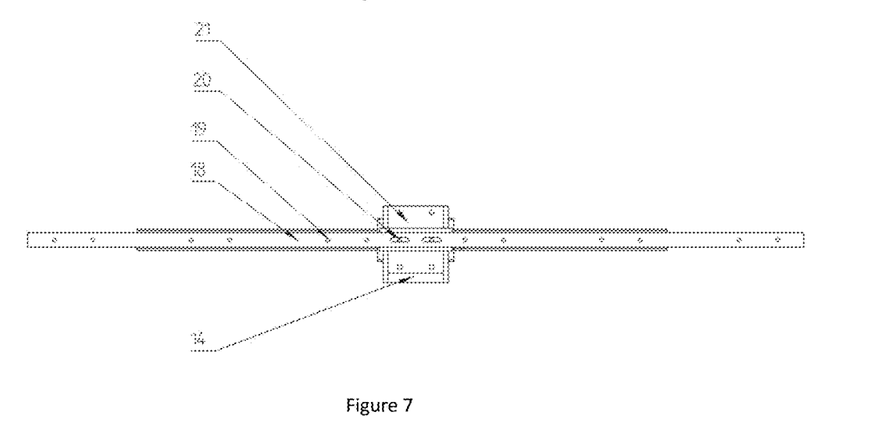
FIG. 7 is a front view of a linear actuator according to an embodiment of the present invention.
Figure 8:
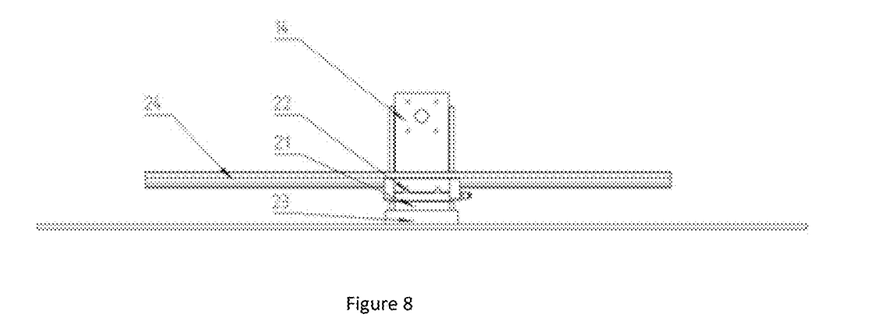
FIG. 8 is a plan view of a linear actuator according to an embodiment of the present invention.
Figure 9:
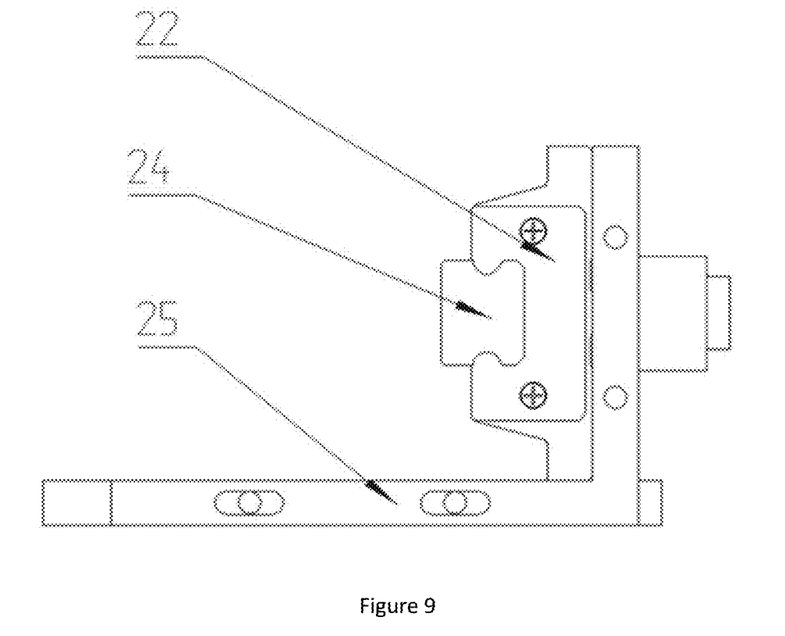
FIG. 9 is a left side view of a linear actuator according to an embodiment of the present invention.
Figure 10:
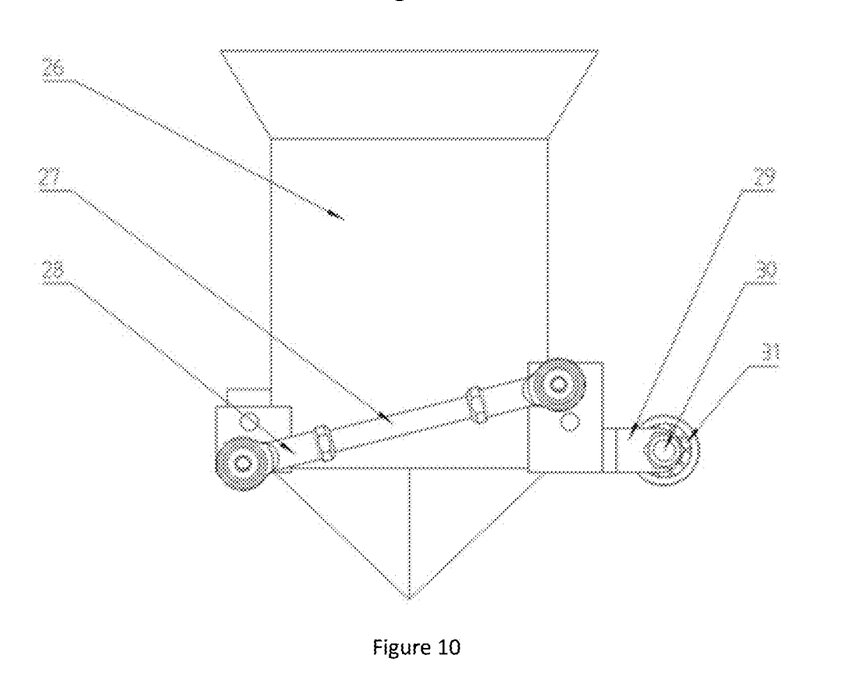
FIG. 10 is a left side view of a seedling cup according to an embodiment of the present invention.
Figure 11:
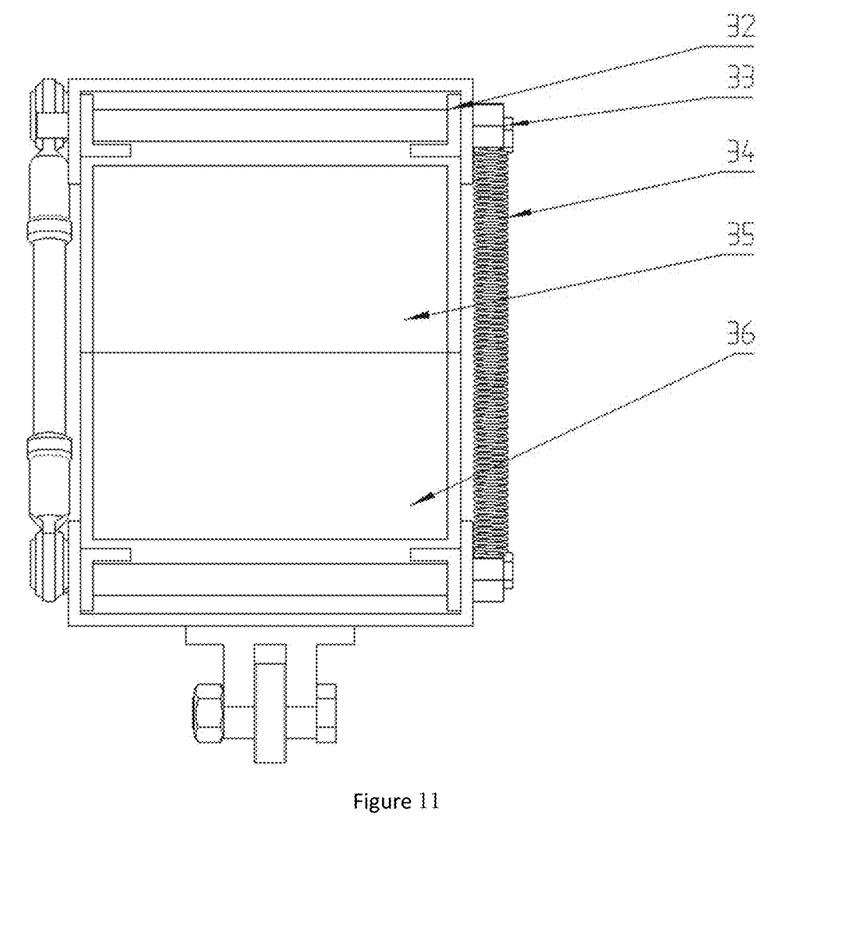
FIG. 11 is a schematic view of a lower end portion of a seedling cup according to an embodiment of the present invention.
Figure 12:
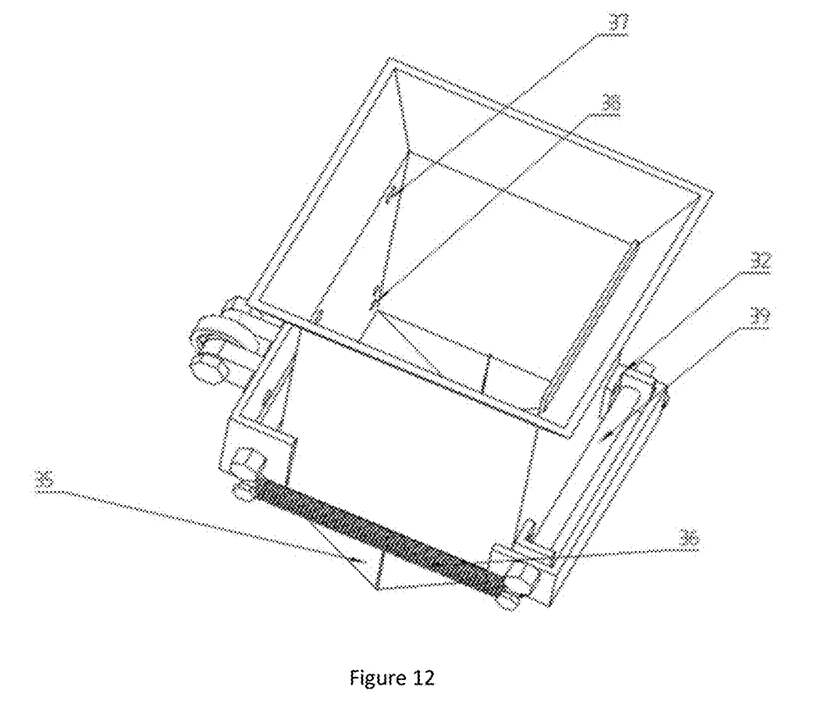
FIG. 12 is an overall schematic view of a seedling cup according to an embodiment of the present invention.
Figure 13:
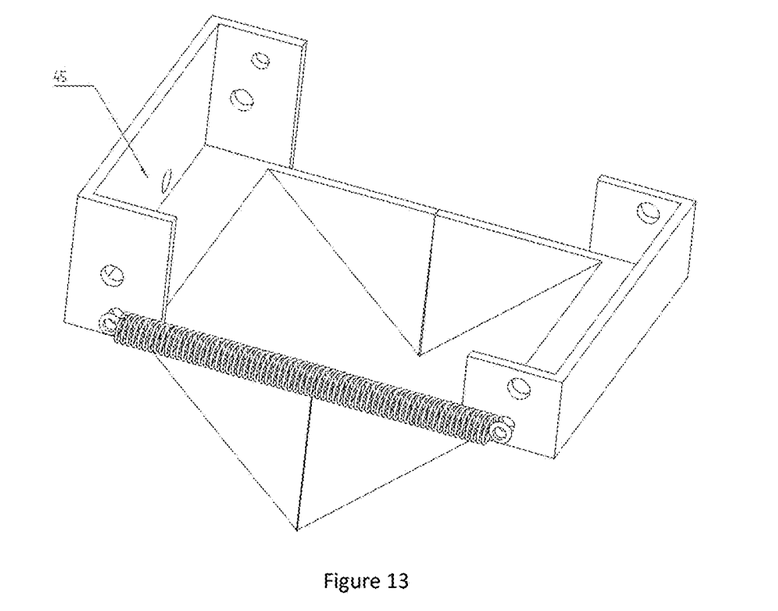
FIG. 13 is a schematic view of a lower portion of a seedling cup according to an embodiment of the present invention.

As shown in FIGS. 7, 8 and 9, the linear actuator 3 includes a cup holder 18, a tray mounting hole 19, a slider connection plate 21, a slider 22, a cup connection plate 23, and a linear guide 24. The linear guide 24 is fixed to the frame 1 through a linear guide mounting hole 6; the slider 22 has a ball which is mounted on the linear guide 24 so as to be moved. The four through holes on the upper surface of the slider connecting plate 21 and the four through holes on the slider 22 are fixed by screws; the cup connection plate 23 are provided with two through holes and are located between the slider connection plate 21 and the cup holder 18, which connecting the cup holder 18 with the slider connecting plate 21 by screws; the lower end of the motor connection plate 14 has three slots, which are screwed together with the lower end of the slider connection plate 21, and the motor connection plate 14 can be moved forward and backward to adjust the nesting position of the seedling cup 4. The cup holder 18 is provided with a plurality of cup mounting holes 19 so that the seedling cups can be mounted on the cup holder 18 by screws; the rack 13 is fixed to the frame 1 by a rack mounting hole 7 and meshed with the gear 15. There are two oval-shaped moving frame slots 20 in the middle of the cup holder 18, which can be used to adjust the left and right distances of the cup 4 to facilitate the identification of the seedling position.

Preferably, the drive attachment mount 25 is provided on both sides of the motor connection plate 14 and the slider connection plate 21, respectively; the drive mounting bracket 25 is a right angle plate, and its upper straight plate is connected to one side of the slider connecting plate 21 by screws, and its lower straight plate is connected to the motor connecting plate 14 by screws. The transmission attachment 25 can tighten the connection between the motor connection plate 14 and the slider connection plate 21.

Preferably, the carriage 1 is provided with a slider moving groove 10, and the lower end of the slider 22 is movable around the slider movement groove 10 which is served as a guide.

As shown in FIGS. 10, 11, 12 and 13, the seedling cup 4 includes a support cup body 26, a screw 27, a joint bearing 28, a bearing seat 29, a short screw 30, a bearing 31, a sleeve connecting plate 32, a spring 34, a first hinge 35, a second hinge 36, and a sleeve 39.

The upper end of the seedling cup body 26 is connected to the cup holder 18 by screws, and the lower ends of the care cup body 26 are connected to the hinges 45 of the first hinge 35 and the second hinge 36, respectively; the lower portion of the first hinge 35 and the second hinge 36 is an inverted triangle.

Preferably, the lower ends of the holder cup body 26 are connected to the hinges 45 of the first hinge 35 and the second hinge 36 through a mechanism which comprises the sleeve connecting plate 32, the long screw 33 and the sleeve 39; the baffle connecting plate 32 is a right angle plate, and the through holes are provided on both sides of the straight plate; four bush connecting plates 32 are located about four positions of the four corners of the hinge holder 45 and the lower end of the support body 26; one side of the bobbin connecting plate 32 is connected to the lower end of the cup body 26 and the other side is connected to the hinge holder 45. The sleeve 39 is located between the two baffle connecting plates 32; the bushings 39 and the two baffle connecting plates 32 are connected by a long screw which can be rotated about by the first hinge 35 and the second hinge 36 so as to realize the opening and closing of the lower end of the seedling cups 4.

The two joint bearing 28 are respectively mounted on the same end of the two hinge brackets 45 by through-holes and dislocated; both ends of the screw 27 are screwed to the joint bearing 28 respectively and the distance between the two joint bearings 28 can be adjusted by rotating the screw 27.

Both ends of the spring 34 are fixedly connected to the through holes of the other ends of the two hinges 45 by screws.

The bearing seat 29 is fixed to the through hole of one side of the hinge bracket 45 of the first hinge 35 by screws, and the bearing 31 is connected to the bearing seat 29 through the short screw 30; the bearing 31 is rotated about the short screw 30; the curved surface of the pushing block 44 may be in contact with the bearing 31. As the entire cup 4 is in a resting state, the spring 34 closes the lower end of the cup 4 by pulling it, but when the bearing 31 is pushed upward by the cylinder, the first hinge 35 is rotated about the long screw 33, and the second hinge 36 drives the second hinge 36 to be rotated around the long screw 33 due to the constant distance between the two joint bearings 28 to effect the lower end of the cup 4 open. This is the process of opening and closing the seedling cup 4.

Figure 14:
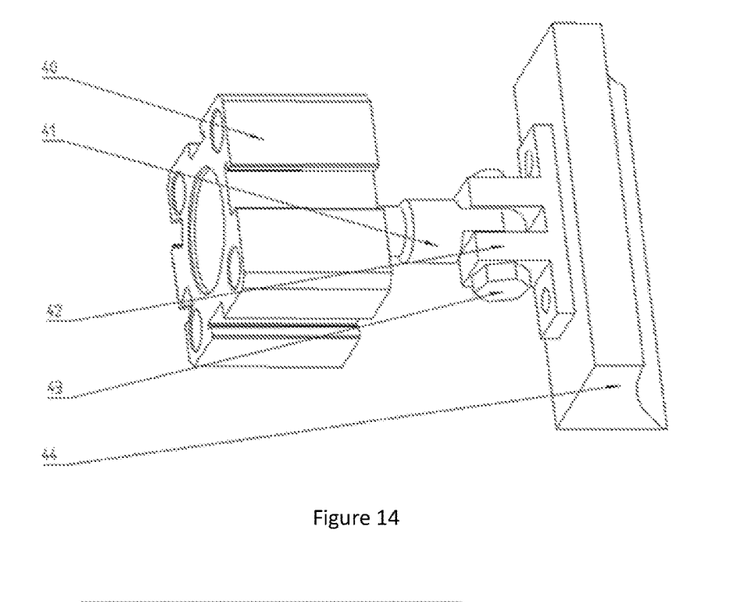
FIG. 14 is a schematic view of a cylinder pushing device according to an embodiment of the present invention.

As shown in FIG. 14, the two cylinder pushing device 5 are mounted on both ends of the frame 1 and are located behind the seedling cups 4, including a cylinder 40, a cylinder accessory 41, a cylinder connector 42, a screw 43, and a push block 44, respectively. The cylinder pushing device 5 drives cups 4 to be opened and retracts it to be closed.

The cylinders 40 are mounted at both ends of the frame 1 through cylinder mounting holes 8, respectively; one end of the cylinder fitting 41 is threaded around a push rod of the cylinder 40 and the other end of the it is connected with the cylinder connector 42 through the screw 43; the cylinder connector 42 is connected to the threaded hole on the back of the pushing block 44 by a screw; the front face of the pusher block 44 is curved.

The curved surface of the pushing block 44 can be brought into contact with the bearing 31. The cylinder 40 of the cylinder pushing device 5 drives the lower part of the seedling cup 4 to open and retracts it to close to realize the basic function of seedling separating.

Figure 15:
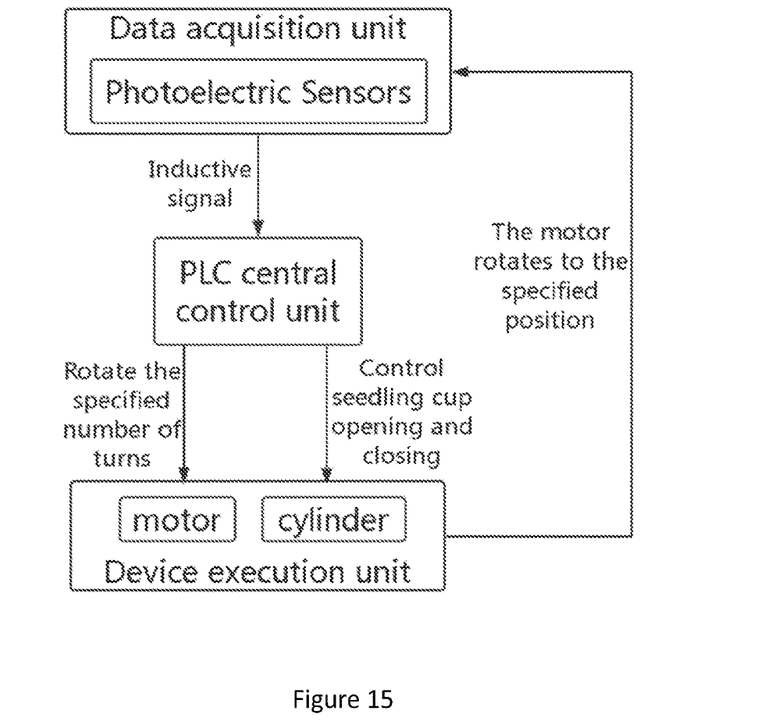
FIG. 15 is a control system frame diagram according to an embodiment of the present invention.

As shown in FIG. 15, the control system includes a PLC central control unit, a data acquisition unit, and a device execution unit. The data acquisition unit comprises two sensors 9 and the sensors 9 are photoelectric sensors; the PLC central control unit comprises a motor control module and a cylinder control module; the device execution unit comprises a motor 17 and two cylinders 40 and the motor 17 is stepper motor. The PLC central control unit is connected with the data acquisition unit and the device execution unit. The photoelectric sensor is mounted on the left and right ends of the frame 1 for sensing whether the induction motor 17 reaches the set position and then transmitting the induction signal to the PLC central control unit; the PLC central control unit controls the device execution unit, and the data acquisition unit receives a signal feedback to the PLC central control unit when the device execution unit runs to a designated position; the PLC central control unit controls the operation of the device execution unit according to the feedback; the stepping motor is used to move the seedling cup 4 linearly; the cylinder 40 is used for opening and closing the lower end of the cup 4; the stepping motor 17 is fixed to the motor mounting bracket with the slider 22, and the two cylinders 40 are mounted on the left and right ends of the frame 1, respectively.

In the present embodiment, the number of the cups 4 is six, and these cups 4 are sequentially numbered as the first cup, the second cup, the third cup, the fourth cup, the fifth cup and the sixth cup. The distance between the two cylinder pushing devices 5 is corresponding to three cups 4; the distance between the two sensors 9 is the distance between the three cups 4 minus the lateral distance of the power device 2.

Figure 16:
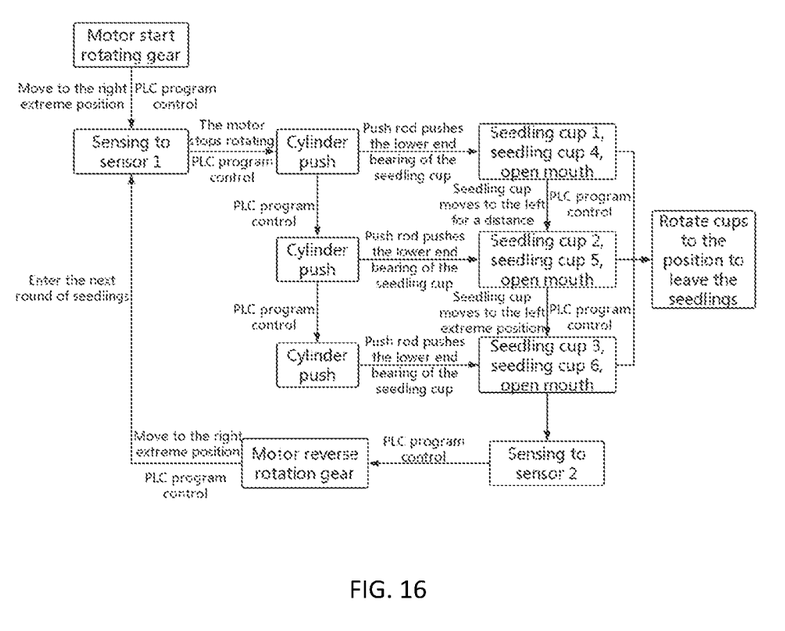
FIG. 16 is a control flow chart of an embodiment of the present invention.

As shown in FIG. 16, the entire seedling device is operated as follows: the motor 17, the cylinder 40 and the sensor 9 are connected to the control system, respectively, when the motor 17 is energized, the motor 17 rotates the gear 15 and the gear 15 rolls on the rack 13 with the slider 22 attached to the cups 4 to linearly drive. Then, the first sensor 9 receives the signal and transmits the signal to the PLC central control unit when the motor 17 reaches the designated position and the first and fourth cups to reach the seedling point, as the same time, the motor control module controls the motor 17 to stop the rotation, the cylinder control module controls the cylinder 40 to push the lower end bearing 31 of the cup 4 and the first and the fourth cups separate seedlings. After that, the cylinder 40 returns and the motor 17 is moved a distance according to the program until the second cup and the fifth cup reach the designated position, the cylinder 40 start to open the bottom of the cup 4 to separate seedlings. Then, the motor 17 continues to be moved a distance according to the program until the third cup and the sixth cup reach the designated position, the cylinder 40 start to open the bottom of the cup 4 to separate seedlings. After reaching the position, the second sensor 9 receives the signal, then the motor 17 returns to the initial position for the second round of the seedling, and the seedling action is carried out in two rows from the cups.

The seedling device according to the invention has simple structure, high program control and high reliability, in which, the motor drives seedling cups around the move, the cylinders push the cups to be opened and closed. Down the seedling attitude is better, due to the seedling cups vertical down, and the point position of seedling can also be adjusted.

It should be understood that although the present specification has been described in terms of various examples, not every embodiment includes only one independent technical solution. This description of the specification is for the sake of clarity only. Those skilled in the art should refer to the specification as a whole, and the technical solutions in the various embodiments may be suitably combined to form other embodiment which may be understood by those skilled in the art.

A detailed description of the series listed above is merely illustrative of the present invention, and is not intended to limit the scope of the invention. Equivalents of those skilled in the art without departing from the spirit of the invention or changes are intended to be included within the scope of the present invention.

The invention claimed is:
1. A seedling separating device based on a rack and gear drive, which comprises a frame;
   a power device;
   a linear transmission device;
   a plurality of cups;
   at least one cylinder pushing device; and
   a control system; and
   a sensor and a sensor holder mounted on the frame; one end of the sensor holder is mounted on the frame through a sensor mounting hole; wherein the sensor is mounted on another end of the sensor holder;
   wherein the power device includes a motor connection plate, a gear, a sleeve and a motor;
   wherein the motor is fixed on an upper end of the motor connection plate; a shaft sleeve is arranged on a rotation shaft of the motor and is fixedly connected with the motor; a lower end of the gear is braced and fixedly connected with the rotation shaft of the motor;
   wherein the linear transmission device includes a cup holder, cup mounting holes, a slider connecting plate, a slider, a cup connecting plate and a linear guide;
   wherein the linear guide is fixed to the frame through a linear guide mounting hole;
   wherein the slider is mounted within a linear guide;
   wherein the slider connecting plate is mounted on the slider by screws;
   wherein a cup connection plate is provided with through holes and is located between the slider connecting plate and the cup holder;
   wherein the slider connecting plate is connected with the cup holder by screws;
   wherein the cup holder is provided with a plurality of cup mounting holes;
   wherein seedling cups are mounted on the cup holder by screws; a rack is fixed to the frame through a rack mounting hole and is meshed with the gear;
   wherein the at least one cylinder pushing device is mounted on the frame and is located behind the cups;
   wherein the at least one cylinder pushing device drives a lower part of the cup to open and retracts the lower part of the cup to close;
   wherein the control system comprises a PLC central control unit, a data acquisition unit and a device execution unit;
   wherein the data acquisition unit comprises sensors;
   wherein the PLC central control unit comprises a motor control module and a cylinder control module;
   wherein the device execution unit comprises the motor and at least one cylinder;
   wherein the PLC central control unit is respectively connected with the data acquisition unit and the device execution unit;
   wherein a photoelectric sensor is used for sensing whether the motor reaches a set position and then transmitting a induction signal to the PLC central control unit;
   wherein the motor control module controls the motor to stop or advance according to a signal; and
   wherein the cylinder control module controls the cylinder according to the signal to open or close the lower part of the seedling cups.

2. The seedling separating device of claim 1, wherein the number of the cylinder pushing devices is two, each cylinder pushing device including a cylinder, a cylinder fitting, a cylinder connector, a first and second screw and a pushing block, respectively;
   wherein the cylinders are respectively installed at first and second ends of the frame through cylinder mounting holes; a first end of the cylinder fitting is screwed around a push rod of the cylinder and a second end, opposite the first end, of the cylinder fitting is connected to the cylinder connector by the first screw; the cylinder connector is connected with a back side of the pushing block by the second screw; a front face of the pushing block is curved.

3. The seedling separating device of claim 2, wherein a number of the sensor and the sensor holder is two, and the two sensors are respectively mounted on the first and second ends of the frame through the sensor holder.

4. The seedling separating device of claim 1, wherein the seedling cups include a support body with an upper end and a lower end, a long screw, a joint bearing, a bearing seat, a short screw, a bearing, a spring with two ends, a first hinge and a second hinge, each with first end, second end, and a hinge portion;
   wherein the upper end of the support body is connected with the cup holder by the long screw and the lower ends of the cup body are respectively connected with the hinge portion of the first and the second hinges; a lower part of the first and the second hinge are inverted triangles;
   wherein the two joint bearings are respectively mounted on first ends of two hinge brackets and are dislocated up and down; the ends of the long screw are respectively screwed to the joint bearing;
   wherein the two ends of the spring are fixedly connected with second ends of the two hinge brackets respectively;
   wherein the bearing seat is mounted on the first end of the first hinge; the bearing is connected with the bearing seat through a short screw, and the bearing is rotated about the short screw; a curved surface of a pushing block is in contact with the bearing.

5. The seedling separating device of claim 4, wherein the seedling cups comprise at least four bushing connecting plate, a long screw and a sleeve;
   wherein the bushing connecting plate is a right angle plate with two straight plate portions and is provided with through holes on the two straight plate portions;
   wherein four bushing connecting plates are respectively connected with the hinge bracket at a lower end of the supporting cup body and the positions of four corners of a hinge stent; and
   wherein one side of a baffle connecting plate is connected with the lower end of the cup main body and the other side is connected with the hinge bracket; and
   wherein the sleeve is located between two of the bushing connecting plates and two of bushing connecting plates are connected by the long screw, which can be rotated about by the first and second hinge.

6. The seedling separating device of claim 1, wherein there are two oval-shaped movable frame slots in a middle portion of the cup holder.

7. The seedling separating device of claim 1, wherein the motor connecting plate has a first and a second side and transmission mounting brackets are provided on the first and second sides of the motor connecting plate and the slider connecting plate, respectively; and
   wherein the transmission mounting bracket is a right angle plate having a lower straight plate and an upper straight plate, the upper straight plate is connected with one side of the slider connecting plate by screws and the lower straight plate is connected with the motor connecting plate by screws.

8. The seedling separating device of claim 1, wherein the frame is provided with a slider moving groove; a lower end of the slider can be moved left and right in the slider movement groove.

9. The seedling separating device of claim 1, wherein there are six seedling cups.

10. The seedling separating device of claim 9, wherein there are two cylinder pushing devices, and the two cylinder pushing devices are spaced by three cups; and the two sensors are spaced by a distance between the three cups subtracting a lateral distance of the power device.

* * * * *